United States Patent [19]

Dopp

[11] 4,119,215
[45] Oct. 10, 1978

[54] AUTOMATIC LOADING-UNLOADING MECHANISM FOR A POT BROACHING MACHINE

[75] Inventor: James Wellington Dopp, Rochester, Mich.

[73] Assignee: The Babcock & Wilcox Company, New York, N.Y.

[21] Appl. No.: 811,791

[22] Filed: Jun. 30, 1977

[51] Int. Cl.² ............................................. B65G 47/82
[52] U.S. Cl. .................................. 214/1 BB; 29/809; 90/86; 198/485; 214/1.4
[58] Field of Search ...................... 214/1 BB, 1.4, 1.5, 214/1.6, 16.4 C, 23, 24; 198/339, 485, 736, 741, 747; 90/79, 86; 29/791, 809

[56] References Cited

U.S. PATENT DOCUMENTS

| | | | |
|---|---|---|---|
| 2,508,861 | 5/1950 | Jessen | 214/6 P X |
| 3,008,589 | 11/1961 | Caldwell | 214/1 BB |
| 3,075,651 | 1/1963 | Kaden | 214/1 BB |
| 3,526,325 | 9/1970 | Temple | 214/16.4 C |
| 3,656,401 | 4/1972 | Psenka | 90/86 X |

Primary Examiner—L. J. Paperner
Attorney, Agent, or Firm—Vytas R. Matas; Joseph M. Maguire

[57] ABSTRACT

A loading and unloading mechanism is mounted to a pot broach to allow both loading and unloading of the pot broach during a single cycle. The mechanism includes a carriage having offset loading and unloading arms mounted thereto which simultaneously move in response to a single operating cylinder to load a blank workpiece into the inlet of the pot broach while unloading a finished workpiece from the outlet of the pot broach.

10 Claims, 2 Drawing Figures

AUTOMATIC LOADING-UNLOADING MECHANISM FOR A POT BROACHING MACHINE

BACKGROUND OF THE INVENTION

1. Field of the Invention

The present invention generally relates to pot broaching load-unload mechanisms and particularly to pot broaching machines having a single mechanism for simultaneously loading and unloading the machine.

2. Description of the Prior Art

Machines for broaching the teeth on an external gear as a consequence of a single passage of a work blank through a generally tubular broach are known. The teeth of the broach are located in a pot broach and are usually arranged in longitudinal alignment and are appropriately stepped to perform the required tooth cutting operation. If the gear is a spur gear the teeth are arranged in series extending parallel to the axis of the broach. If the gear is a helical gear the teeth are arranged in helically extending series.

A single passage of the gear blank upwardly through the pot broach results in a complete cutting operation forming the required teeth on the periphery of the gear. Loading and unloading of the pot broach is as follows. The blank gears are moved along an inlet chute. Means are provided for loading individual workpieces into the pot broach which include means for advancing the blank gears into a preliminary position directly into the pot broach where they are coupled to a drive means. Upward movement of the drive means causes the blank gear to be forced through the generally tubular broach providing a finished gear at the outlet. The gear is then moved down an exit chute by some separate unloading means. Examples of such prior art machines may be seen in U.S. Pat. No. 3,656,401 and the reader is referred thereto for further details of structure and operation.

Such known machines have no means for loading and unloading the pot broach with a single mechanical mechanism during one cycle thereof. Separate mechanisms are utilized for loading and unloading resulting in more parts, increased machine cost, and decreased reliability.

SUMMARY OF THE INVENTION

The present invention solves the forementioned problems associated with the prior art devices as well as others by providing a single mechanical mechanism which simultaneously loads and unloads the pot broach during a single cycle.

In a specific embodiment of the invention the mechanism is mounted on a horizontal face of the support on which the pot broach is vertically mounted with the inlet side of the pot broach being affixed to the horizontal face of the support. The mechanism has a carriage mounted proximate to the pot broaching machine. The loading and unloading arms are movably mounted to the carriage and are simultaneously moved in response to movement of a single operating piston. The loading arm feeds an unfinished workpiece into the pot broach inlet while the unloading arm simultaneously withdraws the finished workpiece from the outlet area of the pot broach. Thus during one cycle of this single mechanical mechanism the unfinished workpiece is loaded to the pot broach and the finished workpiece is unloaded from the pot broach.

From the foregoing it will be seen that one aspect of the present invention is to provide a mechanism which will insert an unfinished workpiece into the machine and remove a finished workpiece therefrom during one cycle of the mechanism.

Another aspect of the present invention is to provide a single driving source operated mechanism for simultaneously loading and unloading a workpiece to and from a pot broaching machine.

These and other aspects of the present invention will be more fully understood after a review of the following description of the preferred embodiments and the drawings.

DESCRIPTION OF THE PREFERRED EMBODIMENT

Figure 1:
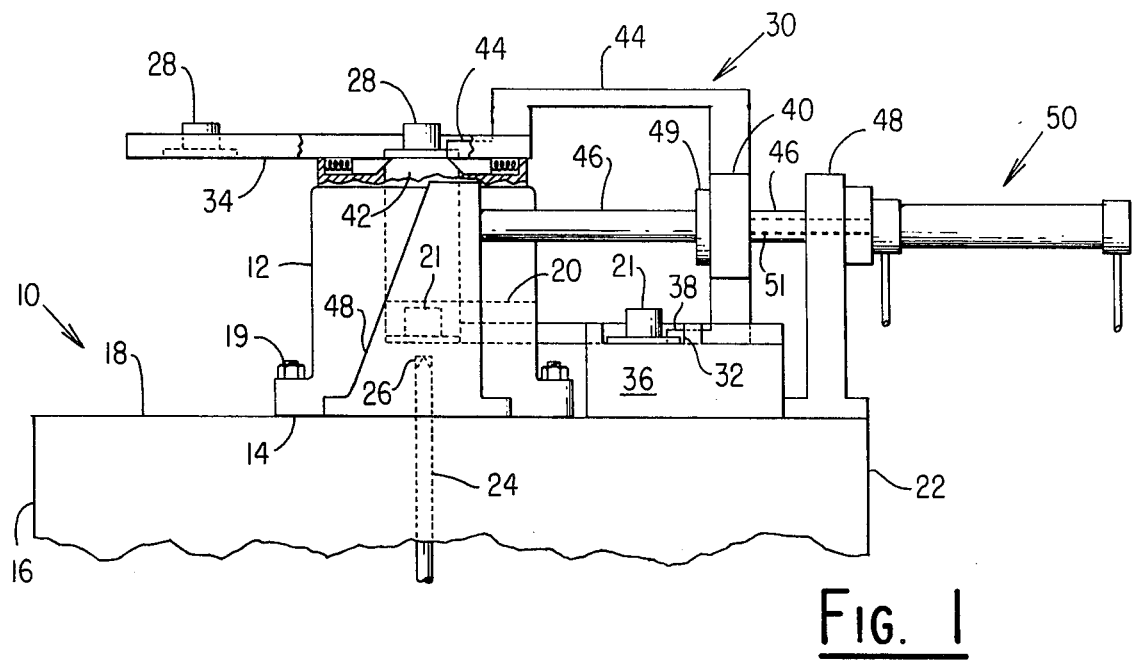
FIG. 1 is a side view of the load-unload mechanism of the present invention.
Figure 2:
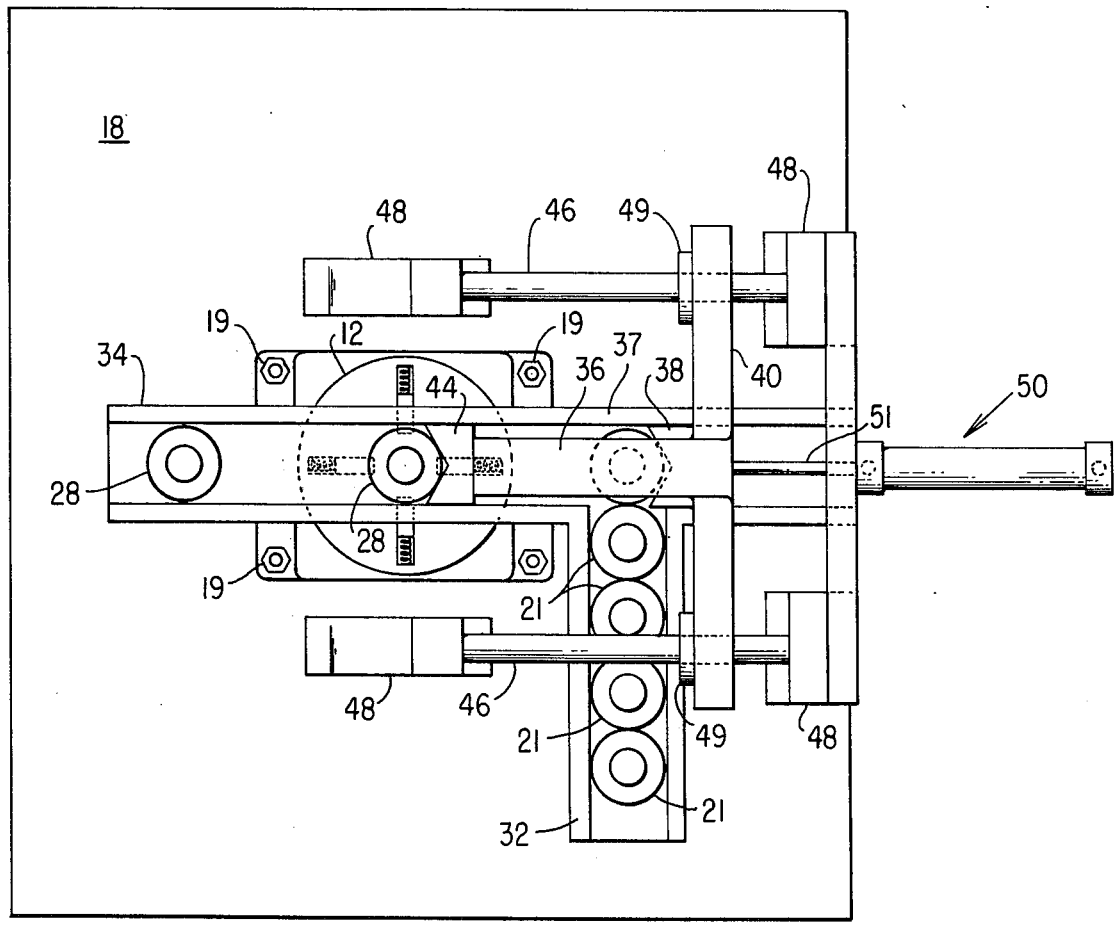
FIG. 2 is a top view of the mechanism of FIG. 1.

Referring now to the drawings, FIGS. 1 and 2 disclose a pot broaching machine 10 which has a known pot broach 12 vertically mounted along its horizontal base 14 to a support structure 16.

The support structure 16 has a pot broach mounting base 18 to which the pot broach 12 is rigidly affixed by well known means such as nuts and bolts 19. The pot broach 12 has an opening 20 through which blank workpieces 21 are inserted for drawing through the pot broach 12. The base 18 of the support structure 16 is mounted to a frame 22 which is affixed to a floor (not shown) and which supports a known piston and cylinder device in which a piston is vertically movable to push the workpiece 21 through the pot broach 12 by way of a shaft 24 having a part retaining means 26 such as an expandable collet or solid plug for retaining the workpiece 21. This vertical mounting of the pot broach 12 along its horizontal end to the support structure 16 provides a symmetrical loading around the center line of the machine 10 yielding added rigidity to the entire structure.

The machine 10 is set up to load unfinished workpieces 21 to the inlet end 20 of the pot broach 12 and to simultaneously unload finished workpieces 28 from the opposite end of the pot broach 12. To accomplish this a workpiece transfer mechanism 30 is provided which operated between a loading chute 32, which may be sloped, for carrying a plurality of unfinished workpieces 21 and an unloading chute 34 which may be conveyorized or sloped for carrying a plurality of finished workpieces 28. The unfinished workpieces 21 are moved along the chute 32 by various means not shown including gravity or the force of adjoining workpieces 21 pressing each other to move the workpieces along a platform 36 whereon they are retained in position for loading by the transfer mechanism 30 by the retaining wall 37 of the chute 32.

Turning now to just the loading of the blank workpieces 21 which is done simultaneously with the unloading of finished workpieces 28, it will be seen that the transfer mechanism 30 has a loading V-membered arm 38 formed as a right angle with the vertical section of the arm 38 being connected to a main support arm 40 which moves laterally with the main arm 40 to push an unfinished workpiece 21 resting against the wall 37 into the pot broach 12. Once the placement of the unfinished workpiece 21 into the pot broach 12 is detected by any known detecting means the transfer mechanism 30 is reset to its shown position and a piston and cylinder (not shown) are actuated to push the unfinished workpiece 21 through the pot broach 12 by the shaft 24. When the workpiece is detected by the same known detector means as having been pushed through the pot broach 12 and emerges from an outlet 42 of the pot broach 12 the workpiece retaining means 26 is released and the shaft 24 is retracted to its shown position allowing the transfer mechanism 30 to be again actuated to move the next unfinished workpiece 21 which has slid against the wall 37 of the chute 32 into the pot broach 12.

Simultaneously with the before-described loading operation, a finished workpiece 28 is pushed into the unloading chute 34 by a V-membered unloading arm 44 which is also formed as a right angle having its vertical section connected to the main arm 40 and thus moves simultaneously with the loading arm 38.

The finished workpiece 28 moves along the unloading chute 34 by the force of the unloading arm 44 pushing the latest finished workpiece 28 against the previously finished workpieces 28 already on the chute 34.

The main arm 40 is mounted to move along a pair of stationary guide rods 46 which are supported between adjacent support members 48 mounted to the base 18. To allow smooth movement of the main arm 40 on the guide rods 46 the main arm 40 has a pair of bearings 49. A single piston and cylinder assembly 50 drives the main arm 40 along the guide rods 46 and consequently the loading and unloading arms 38, 44 through a piston rod 51 connected to the main arm 40 to reciprocally move the main arm 40 along the guide rods 46. Thus the single piston and cylinder assembly 50 causes the loading and unloading arms 38, 44 to simultaneously load and unload the pot broach 12.

Reviewing the simultaneous action of the loading and unloading arms 38, 44 it is seen that they are vertically spaced to be aligned with the pot broach 12, inlet 20, and outlet 42. Thus when the loading arm 38 has placed the unfinished workpiece 21 in the pot broach 12, the unloading arm 44 has pushed the finished workpiece 28 onto the unloading chute 34. The piston assembly 50 is then retracted and the loading-unloading arms 38, 44 are reset to their FIGS. 1, 2 positions also simultaneously.

Certain modifications and improvements will occur to those skilled in the art after reading the foregoing specification. It will be understood that such additions and modifications were deleted herein for the sake of conciseness and readability but are properly within the scope of the appended claims.

What I claim is:

1. A work transfer mechanism for simultaneously loading an unfinished workpiece into a pot broach and unloading a finished workpiece from a pot broach comprising:
    a frame member linearly movable with respect to the pot broach;
    drive means connected to said frame member to reciprocally move said frame member between a first position away from the pot broach and a second position proximate to the pot broach;
    a loading arm connected to said frame member at one end to be movable therewith and to be located proximate to the inlet of the pot broach to allow the unfinished workpiece to move from the inlet of the pot broach into the pot broach; and
    an unloading arm connected to said frame member at the end opposite said first end to be movable therewith and located proximate to the outlet of the pot broach to allow the finished workpiece to move away from the outlet of the pot broach simultaneously with the loading arm moving the unfinished workpiece into the pot broach.

2. A work transfer mechanism as set forth in claim 1 including a guide member mounted proximately to the pot broach and having said frame member slidably movable thereon between said first and second position.

3. A work transfer mechanism as set forth in claim 2 including a second guide member spacedly mounted from said first guide member to have said frame member simultaneously move along said first and second guide members between said first and second position.

4. A work transfer mechanism as set forth in claim 3 wherein said main frame is a horizontally elongated plate having a pair of bearings at opposite sides thereof slidably movable on said first and second guide members.

5. A work transfer mechanism as set forth in claim 4 wherein said loading and unloading arms are vertically spaced in their connection to said elongated plate and wherein said first and second guide members are horizontally spaced and located in a plane between said loading and unloading arms.

6. A work transfer mechanism as set forth in claim 2 wherein said drive means includes a hydraulic piston connected to said frame member to move said frame member along said guide member between said first and second positions.

7. A work transfer mechanism as set forth in claim 6 including:
    a first chute mounted proximately to the inlet of the pot broach to slide unfinished workpieces in front of said loading arm whenever said frame member and said loading arm connected thereto is moved by said hydraulic piston to said first position; and
    a second chute mounted proximately to the outlet of the pot broach for conveying finished workpieces thereon.

8. A work transfer mechanism as set forth in claim 7 wherein said first chute includes a stop wall mounted substantially perpendicularly to said first chute to stop the unfinished workpieces in a position aligned with said loading arm and the inlet of said pot broach.

9. A work transfer mechanism for simultaneously moving two workpieces from a pot broaching machine comprising:
    a guide member mounted proximately to the pot broaching machine;
    a member slidably movable on said guide member between a first and second distance from the pot broaching machine;
    means for moving said member between said first and second distance from the machine;
    a first arm connected to one end of said member to move a first workpiece from one area of the pot broaching machine with the movement of said member; and
    a second arm connected to the opposite end of said member to move a second workpiece from a second area of the pot broaching machine simultaneously with the movement of said member and said first arm.

10. A work transfer mechanism as set forth in claim 9 wherein said moving means includes a hydraulic piston connected to said member to move said member and said first and second arms between said first and second distances from the machine.

* * * * *